United States Patent
Condict et al.

(10) Patent No.: US 7,039,312 B1
(45) Date of Patent: May 2, 2006

(54) DISTRIBUTED INTELLIGENCE WAVELENGTH DIVISION MULTIPLEXED NETWORK

(75) Inventors: Keith A. Condict, Gambrills, MD (US); Stephen R. Harmon, Severn, MD (US); Wesley R. Jones, Gambrills, MD (US); Michael B. Peters-Rodbell, Dayton, MD (US)

(73) Assignee: Ciena Corp, Linthicum, MD (US)

( * ) Notice: Subject to any disclaimer, the term of this patent is extended or adjusted under 35 U.S.C. 154(b) by 0 days.

(21) Appl. No.: 10/170,734

(22) Filed: Jun. 13, 2002

Related U.S. Application Data

(60) Continuation of application No. 09/728,150, filed on Dec. 1, 2000, which is a division of application No. 08/862,864, filed on May 23, 1997, now Pat. No. 6,163,392.

(51) Int. Cl.
*G02F 1/00* (2006.01)
*G01R 31/08* (2006.01)
*H04L 1/00* (2006.01)

(52) U.S. Cl. .............. 398/5; 398/3; 398/4; 370/223
(58) Field of Classification Search .......... 398/1–5, 398/49, 57, 59, 13, 30–31, 79; 370/223, 370/222
See application file for complete search history.

(56) References Cited

U.S. PATENT DOCUMENTS

| | | | |
|---|---|---|---|
| 4,561,088 A * | 12/1985 | Champlin et al. | 370/222 |
| 4,696,001 A * | 9/1987 | Gagliardi et al. | 398/60 |
| 5,212,577 A | 5/1993 | Nakamura et al. | 359/124 |
| 5,440,418 A | 8/1995 | Ishimura et al. | 359/177 |
| 5,519,705 A * | 5/1996 | Fukutomi | 370/402 |
| 5,532,864 A | 7/1996 | Alexander et al. | 359/177 |
| 5,583,990 A | 12/1996 | Birrittella et al. | 395/200.01 |
| 5,600,637 A * | 2/1997 | Kikuta | 370/389 |
| 5,699,177 A | 12/1997 | Yamamoto | 359/125 |
| 5,815,295 A | 9/1998 | Darcie et al. | 359/128 |
| 5,914,794 A * | 6/1999 | Fee et al. | 398/20 |
| 5,914,798 A * | 6/1999 | Liu | 398/5 |
| 5,930,014 A | 7/1999 | Yamamoto | 359/118 |
| 5,978,115 A | 11/1999 | Condict et al. | 359/124 |
| 6,084,892 A * | 7/2000 | Benash et al. | 370/401 |

FOREIGN PATENT DOCUMENTS

WO  WO9705725  2/1997

OTHER PUBLICATIONS

Tada, Y., et al., "OA&M Framework for Multiwavelength Photonic Transport Networks", IEEE Journal on Selected Areas in Communications, vol. 14, No. 5, Jun. 1996, pp. 914-921.

(Continued)

*Primary Examiner*—M. R. Sedighian
(74) *Attorney, Agent, or Firm*—Merek, Blackmon & Voorhees, LLC

(57) ABSTRACT

The present invention is directed toward a distributed intelligence fiber-optic communication network in which node control processors (NCPs) associated with each network element periodically transmit identification and status information to the other NCPs in the network. Various faults in the network can thus be readily identified, and appropriate tasks for modifying the network in response to the fault (such as rerouting around a defective network element) can be carried out. Further, information continues to be distributed among the NCPs even if a break occurs in a segment of fiber in the network.

21 Claims, 5 Drawing Sheets

OTHER PUBLICATIONS

Bischoff, M. et al., "Operation and Maintenance for An All-Optical Transport Network", IEEE Communications Magazine, vol. 34, No. 11, Nov. 1996, pp. 136-142.

Ramaswami, R., et al., "Distributed Network Control for Wavelength Routed Optical Networks", Proceedings of IEE Infocom 1996. Conference on Computer Communications, Fifteenth Annual Joint Conference of the IEEE Computer and Communications Societies. Networking the Next Generation San Francisco, vol. 1, No. CONF. Mar. 15, 1996, pp. 138-147, Institute of Electrical and Electronics Engineers, right-hand column, lines 16-18, p. 139.

Tada et al., "OA&M Framework for Multiwavelength Photonic Transport Networks," IEEE Journal of Selected Areas in Communications, vol. 14, No. 5, pp. 914-922 (Jun. 1996).

Derr et al., "An Optical Infrastructure for Future Telecommunications Networks," IEEE Communications Magazine, pp. 84-88 (Nov. 1995).

Kaminow et al., "A Wideband All-Optical WDM Network," IEEE J. Select Areas Communications, vol. 14, No. 5, pp. 780-799 (Jun.1996).

Bischoff et al., "Operation and Maintenance for an All-Optical Transport Network," IEEE Communications Magazine, pp. 136-142 (Nov. 1996).

Hill et al., "A Transport Network Layer Based on Optical Network Elements," IEEE Lightwave Technology, pp. 667-679 (May/Jun. 1993).

Chen et al., "In-Service Supervisory EDFA-Repeated Wavelength Division Multiplexing Transmission System," IEEE Photonics Technology Letters, vol. 7, No. 8, pp. 923-925 (Aug. 1995).

Green, "Fiber Optic Networks," pp.344-345, Prentice Hall (1993).

Matsuoka et al., "Supervisory Signal Transmission Methods for Optical Amplifier Repeater Systems," GLOBECOM '90, vol. 3, pp. 1846-1850 (Dec. 2-5, 1990).

Acampora et al., "An Overview of Lightwave Packet Networks," IEEE Network Magazine vol. 3, No. 1, pp. 29-41 (Jan. 1989).

Hedrick, "Routing Information Protocol," Network Working Group, Request for Comments 1058, (Jun. 1988).

Civil Docket Sheet for Case #: 2:05-cv-14LED, pp. 1 through 12.

Nortel Networks Inc., Nortel Networks Limited, and Nortel Networks Corporation's Preliminary Invalidity Contentions served Jun. 14, 2005, pp. 1 through 65.

Ciena's Third Amended Complaint, pp. 1 through 17.

Memorandum and Order dated Sep. 1, 2005, pp. 1 through 6.

* cited by examiner

| DESTINATION | GATEWAY |
|---|---|
| ROUTER 85 | R24 |
| S.0 | S.24 |
| R38 | S.38 |

FIG.4 400

| DESTINATION | GATEWAY |
|---|---|
| ROUTER 85 | R24 |
| S.0 | S.28 |
| R38 | S.38 |

FIG.5 500

| DESTINATION | GATEWAY |
|---|---|
| ROUTER 85 | R24 |
| S.0 | S.34 |
| R38 | S.38 |

FIG.6 600

| DESTINATION | GATEWAY |
|---|---|
| ROUTER 85 | R38 |
| S.0 | S.38 |
| R24 | S.24 |

FIG.7 700

| DESTINATION | GATEWAY |
|---|---|
| ROUTER 85 | R24 |
| S.24 | S.24 |
| S.28 | S.24 |
| S.34 | R24 |
| S.38 | R24 |

FIG.8　400

| DESTINATION | GATEWAY |
|---|---|
| ROUTER 85 | S.24 |
| S.24 | S.28 |
| S.28 | S.24 |
| S.34 | S.24 |
| S.38 | S.24 |

FIG.9　500

| DESTINATION | GATEWAY |
|---|---|
| ROUTER 85 | S.38 |
| S.24 | S.38 |
| S.28 | S.38 |
| S.34 | S.34 |
| S.38 | S.34 |

FIG.10　600

| DESTINATION | GATEWAY |
|---|---|
| ROUTER 85 | R38 |
| S.24 | R38 |
| S.28 | R38 |
| S.34 | S.38 |
| S.38 | S.38 |

FIG.11　700

DISTRIBUTED INTELLIGENCE WAVELENGTH DIVISION MULTIPLEXED NETWORK

CROSS-REFERENCE TO RELATED APPLICATIONS

This application is a continuation of application Ser. No. 09/728,150, filed Dec. 1, 2000, which is a divisional of 08/862,864, filed May 23, 1997, now U.S. Pat. No. 6,163,392, the disclosures of which are incorporated by reference herein.

FIELD OF THE INVENTION

The present invention is directed to an optical network management system in which each network element stores identification and status information related to each of the other elements in the network.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). (Optical systems are described in Gowar, Ed. *Optical Communication Systems*, (Prentice Hall, N.Y.) c. 1993, the disclosure of which is incorporated herein by reference.)

Currently, the majority of optical communication systems are configured to carry an optical channel of a single wavelength over one or more optical waveguides. To convey information from multiple sources, time-division multiplexing (TDM) is frequently employed. In TDM, a particular time slot is assigned to each signal source with the complete signal constructed from portions of the signal collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded (e.g., by laying more fiber optic cables), the cost of such expansion is prohibitive. Consequently, there exists a need for a cost-effective way to increase the capacity of existing optical waveguides.

Wavelength division multiplexing (WDM) is being explored as an approach for increasing the capacity of existing fiber optic networks. WDM systems typically include a plurality of transmitters, each respectively transmitting signals on a designated channel or wavelength. The transmitters are typically housed in a first terminal located at one end of a fiber. The first terminal combines the channels and transmits them on the fiber to a second terminal coupled to an opposite end of the fiber. The channels are then separated and supplied to respective receivers within the second terminal.

The WDM system described in the previous paragraph can be perceived as a point-to-point connection with multiple signals carried from one terminal to the other. However, it is frequently advantageous to add and drop channels at various locations between the two terminals. Accordingly, other network elements, such as add/drop modules are often provided along the fiber in order to inject and/or remove channels from the fiber. Moreover, if the fiber extends over long distances, it is necessary to segment the fiber into sections with each fiber section being coupled to another by an additional network element that amplifies the signal (e.g., an erbium doped fiber amplifier).

To insure proper operation of the WDM system, each network element must be constantly monitored. In the event of a failure, such as a fiber break, the communication system must maintain its ability to monitor each network element. Moreover, for the communication system to automatically respond to a fault, it is necessary for each network element to identify itself and report information about its operating status.

SUMMARY OF THE INVENTION

Consistent with the present invention, a network communication system is provided, comprising an optical communication path and a plurality of network elements disposed along the optical communication path. The optical communication path carries a plurality of first optical signals at respective first wavelengths, and second optical signals at a second wavelength. The second optical signals include identification and status information of each of the plurality of network elements.

Each of the plurality of network elements includes a transmission module coupled to the optical communication path. The transmission module is configured to transmit and receive the second optical signals at the second wavelength. The transmission module comprises a photodetector converting the second optical signals to electrical signals, and a processor coupled to receive the electrical signals generated by the transmission module in response to the second optical signals. The processor comprises a memory for storing the identification and status information of each of the plurality of network elements.

BRIEF DESCRIPTION OF THE DRAWINGS

Advantages of the present invention will be apparent from the following detailed description of the presently preferred embodiments thereof, which description should be considered in conjunction with the accompanying drawings in which:

FIGS. 4–7 illustrate routing tables associated with respective network elements of the fiber optic span shown in FIG. 2 when no fiber break is present; and FIGS. 8–11 illustrate the routing tables associated with respective network elements of the fiber optic span shown in FIG. 2 after a fiber break has occurred.

DETAILED DESCRIPTION

The present invention is directed toward a distributed intelligence fiber-optic communication network in which node control processors (NCPs) associated with each network element periodically transmit identification and status information to the other NCPs in the network. Various faults in the network can thus be readily identified, and appropriate tasks for modifying the network in response td the fault (such as rerouting around a defective network element) can be carried out. Further, information continues to be distributed among the NCPs even if a break occurs in a segment of fiber in the network.

Figure 1:
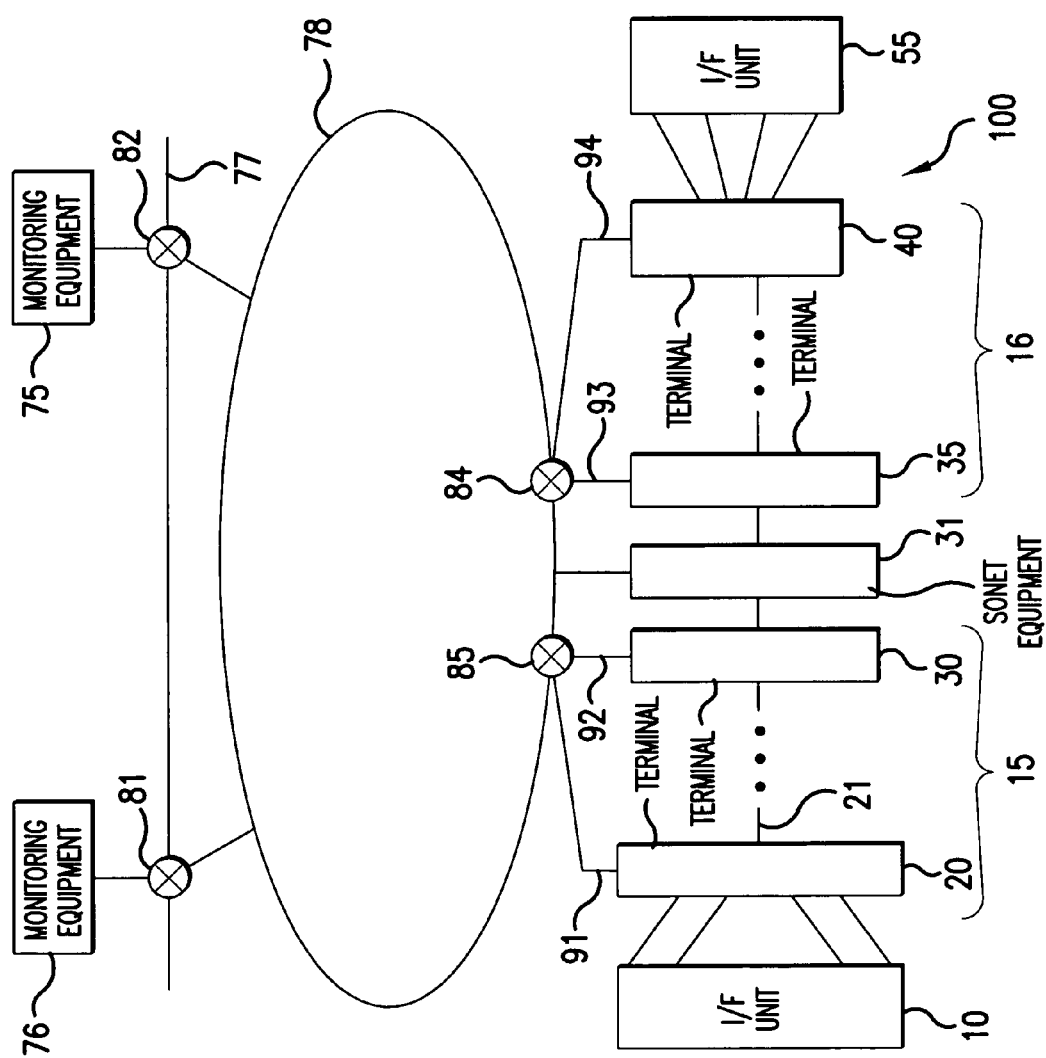
FIG. 1 is a schematic diagram of a fiber optic communication system in accordance with the present invention.

Turning to the drawings in which like reference characters indicate the same or similar elements in each of the several views, FIG. 1 illustrates a WDM communication system 100 in accordance with a feature of the present invention. As seen in FIG. 1, a plurality of optical communication signals, e.g., SONET formatted signals, are supplied by a local network (not shown) to an interface unit 10. The signals are next fed to a terminal 20, which assigns each SONET optical signal to a corresponding one of a plurality of wavelengths or channels. The wavelengths are combined using a multiplexer, as is commonly understood in the art, and supplied to fiber 21 for transmission to terminal 30. As discussed in greater detail below, channels can be added or dropped along a portion of the network between terminals 20 and 30, otherwise known as a "span" 15.

Terminal 30 transmits at least one of the channels to a second span 16 consisting of terminals 35 and 40 and network elements provided therebetween via SONET equipment 31, for example, which serves to further regenerate the optical signals. Terminal 40 includes a demultiplexer and a plurality of receivers (not shown). The demultiplexer separates the individual channels and supplies them to respective receivers. The receivers, in turn, reconstruct the SONET optical signals or signals having another protocol for transmission to interface unit 55 to a local network (not shown). Terminals 35 and 40 are also coupled to monitoring equipment 75 and 76 via Ethernet connections 93 and 94, IP router 84, internet 78, IP routers 81 and 82 and LAN 77.

Although two spans, 15 and 16, are shown in FIG. 1, communication system 100 can include any number of spans. Typically, however, the end terminals of a span are spaced by a distance of approximately 500 km. Accordingly, for transmission between WDM equipment more than 500 km apart, more than one span is typically used.

In addition to the information bearing channels described above, a service channel at a wavelength different than the information bearing channels and carrying diagnostic and span topology information can also be transmitted through each span. Information associated with span 15 is coupled via Ethernet connections 91 and 92, respectively to internet protocol (IP) router 85. This IP router passes the information (described in greater detail below) via internet 78 to additional IP routers 81 and 82. Local area network (LAN) 77 transmits the information from IP routers 81 and 82 to network monitoring equipment 75 and 76, respectively. Finally, information associated with span 16 is similarly passed to network monitoring equipment through Ethernet links 93 and 94 and IP router 84.

Figure 2:
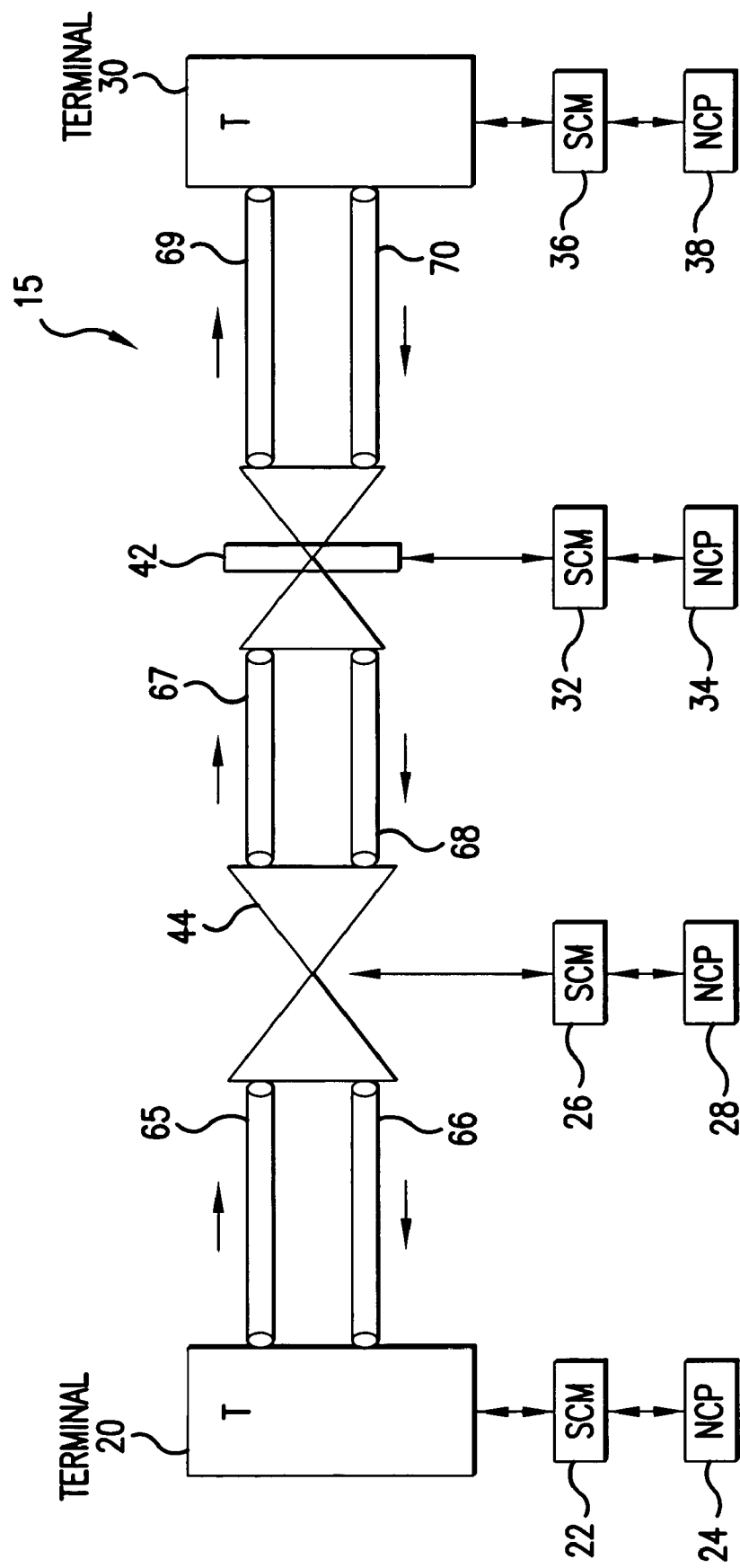
FIG. 2 is a schematic diagram of a fiber optic span in accordance with the present invention.

FIG. 2 illustrates an exemplary span 15 in greater detail. As discussed above, span 15 includes end terminal 20, as well as a plurality of other network elements, as required. These network elements can include regenerative devices, such as an erbium doped fiber amplifier 44, and optical add/drop module 42. As noted above, amplifier 44 amplifies signals input thereto, while add/drop module 42 extracts/inserts one or more channels from the optical communication path.

As further shown in FIG. 2, fibers 65, 67 and 69 carry data communication channels in an "east" direction, while fibers 66, 68 and 70 carry data communication channels in a "west" direction. Typically, these fibers also carry the service channel at a wavelength that is different than those associated with the data communication channels.

Figure 3:
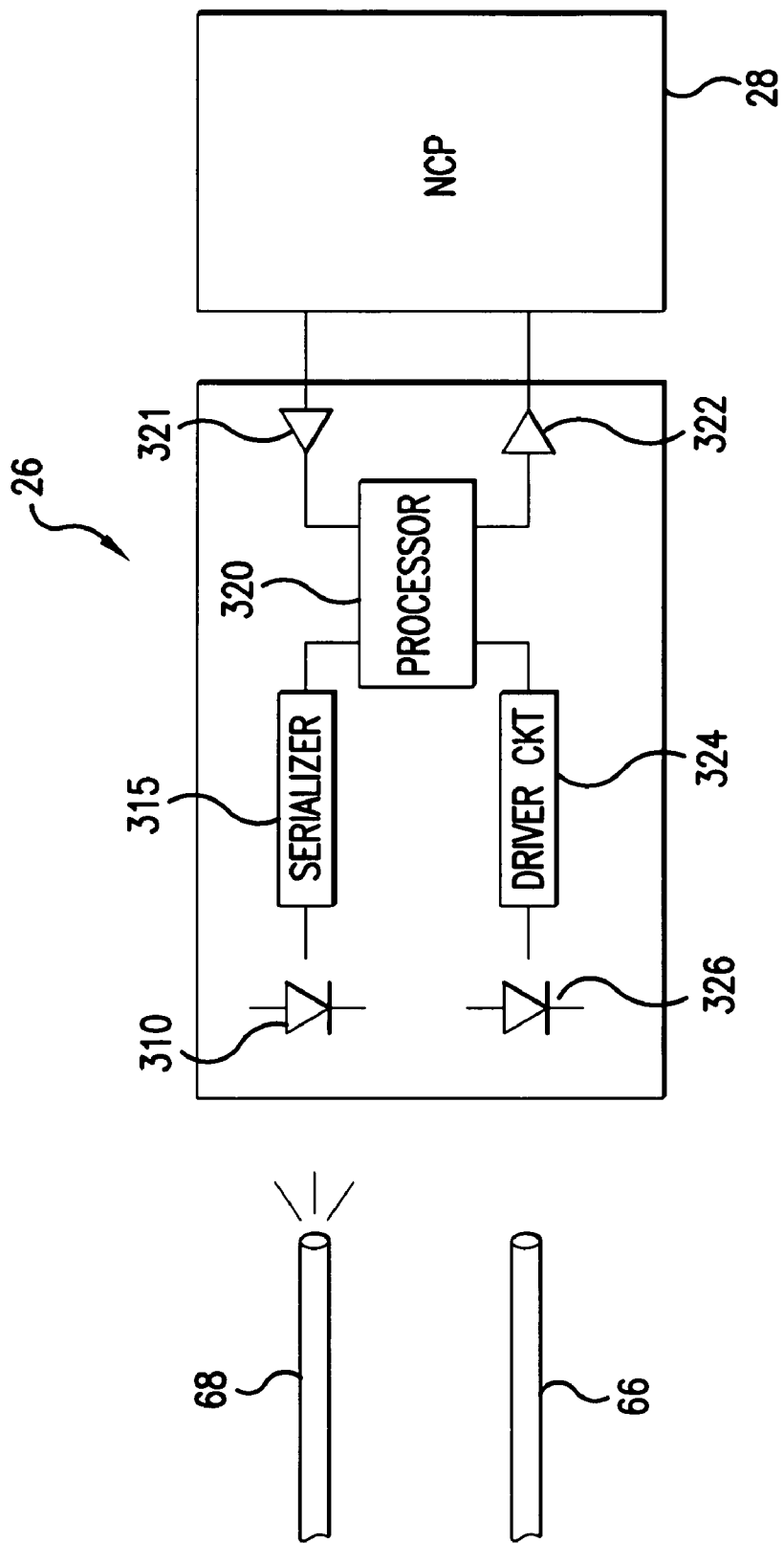
FIG. 3 is a schematic diagram of a service channel modem in accordance with the present invention.

Each network element has an NCP, such as a 68040/060 general purpose microprocessor commercially available from Motorola, and transmission module or service channel modem (SCM), through which the NCP transmits and receives information. As shown in FIG. 3, service channel modem 26 and its connections to fibers 66 and 68 is shown in greater detail. As seen in FIG. 3, service channel modem 26 includes a photodetector 310 sensing incoming light at the service channel wavelength on fiber 68. Photodetector 310 outputs electrical signals in response to the incoming light to serializer 315, which waveshapes the electrical signals and supplies them to processor 320, such as a 68360 microprocessor commercially available from Motorola. In response to these electrical signals, processor 320 supplies an output through buffer 322 to node control processor 28 and or to laser driver circuit 324, which drives laser 326 to output corresponding optical signals on fiber 66. Processor 320 also receives status and identification information, as described above, and passes this information to laser driver 324 so that laser 326 outputs corresponding optical signals to fiber 66. An additional SCM (not shown) is coupled to fibers 65 and 67 in a similar fashion.

Generally, the NCP monitors, stores and transmits status and identification of its network element via the SCM to other network elements in the span. The NCP also the status and identification information of the other network elements in the span received through the SCM. Identification information can include, for example, the network address, and the physical location of the network element.

For each communication channel, a network element can include one or more "sources," "sinks," and "blocks." A source is a point of channel origination, such as a laser, and is usually provided in a terminal. A sink is a point of channel termination where the channel is detected and associated information is passed beyond the span. Sinks are also provided in a terminal. A block, on the other hand, is a point of termination of at least one channel, usually without any further detection. Optical add/drop modules typically include sources, sinks and blocks.

Sinks and blocks generally include in-fiber Bragg gratings, which selectively reflect optical signals at a particular wavelength, while transmitting those at other wavelengths. In-fiber Bragg gratings generally constitute a periodic variation in refractive index over a section of fiber. (Bragg gratings are described in Morey et al., *Photoinduced Bragg Gratings in Optical Fibers*, Optics & Photonics News, February 1994, pp. 9–14, and A. M. Vengsarkar et al., *Long-Period Fiber Gratings As Band-Rejection Filters*, Journal of Lightwave Technology, vol. 14, no. 1, January 1996, pp. 58 –65, the disclosures of which are incorporated herein by reference.) The periodic variation in refractive index can take the form of a series of "peaks" and "valleys," whereby the distance or period between two adjacent refractive index peaks defines, in part, the wavelength to be reflected by the Bragg grating.

The NCP also stores and transmits the operating status of the network. The status of the element is either, operational, degraded or failed. If the element is degraded, it is still operational but may be relying on an auxiliary or redundant component because the main component has failed.

In network elements containing sources, the NCP periodically monitors and stores the status of the temperature, current, and power of the laser associated with each channel. At sinks and blocks, however, variations in the temperature of the grating can cause the grating to expand or contract, resulting in deviations in the period of the grating. In such instances, the grating may transmit the channel to be reflected, and, conversely, reflect the channels to be transmitted. Thus, the NCP monitors the temperature of the grating(s) in network elements, including sources and sinks.

As noted above, the NCPs monitor the status of the sources, sinks, and blocks for each channel in a network element. The status, along with identification information, including the network address, is supplied to respective SCMs for transmission to other NCPs in the span, as well as monitoring equipment 75 and 76.

To distribute the identification and status information, routing data (i.e., data required to direct the identification and status information to the NCPs), must also be distributed among the NCPs of the span. Typically, routing information is distributed through two protocols. The first is typically a routing information protocol (RIP) utilized by the NCPs, to gather and distribute the identification and status information concerning their respective network element, and store such information about other network elements in the span. The second is generally a media access control (MAC) protocol used by the SCMs which act, in part, as conduits for transmitting the status and identification information among the NCPs along the span.

Distribution of information within the NCPs will first be described with reference to FIGS. 2 and 4–11. Each NCP includes RIP software (as described for example in Corner, "Internetworking With TCP/IP", pp. 109–121, incorporated herein by reference) that distributes or routes information to a desired address in accordance with a routing table. Such tables list each destination or network element address and a corresponding gateway or address of an intermediate processor for transferring the information to the destination. The RIP software can also be modified to have a high number of "hops" (i.e., to have a large number of network elements separating two network elements) while maintaining communication between those two network elements. Additionally, the software can be modified to distinguish NCPs in a span from other computers coupled to internet 78.

Exemplary routing tables associated with NCPs 24, 28, 34 and 38 are shown in FIGS. 4–7, respectively. In this example, NCPs 24, 28, 34 and 38 form a "subnetwork", which can be addressed using a common subnetwork address S.0 through Ethernet connections 91 or 93. The network address of NCPs includes the subnetwork address and a host address specific to each NCP. Here, the specific host addresses for NCP 24, 28, 34 and 38, are S.24, S.28, S.34 and S.38, respectively. Moreover, in this example, Ethernet connection 91 connects to interface address R24 of NCP 24, and Ethernet connection 93 connects to address R38, which is coupled to router 85. Addresses R24 and R38 preferably have different subnetwork addresses.

Generally, subnetwork addressing is used in transmitting data from one NCP to another (assuming no fiber breaks are present in the span,). That is, the transmitted data, along with the subnetwork and host addresses, is made available to the SCMs coupled to respective NCPs having the subnetwork address S.0, i.e., each NCP in span 15. The "destination," therefore, of the transmitted data is subnetwork address S.0. The data and addressing information, which is embedded in a media access control (MAC) protocol address, are propagated through the SCMs. At each SCM, a determination is made as to whether the attached MAC address matches the MAC address of the NCP coupled to that SCM. If the addresses match, the data, and MAC addresses are transmitted by the SCM to its respective NCP. The NCP, in turn, extracts the subnetwork and host address from the received MAC address and performs appropriate processing. By using subnetwork addressing, the amount of routing information stored in routing tables at each NCP is reduced.

For example, in the event NCP 24 sends information to NCP 38 via fibers 65, 67 and 69, for example, the information is sent via the service channel through port 24a of NCP 24 to port 38a of NCP 38. Routing software in NCP 24 recognizes that port 38a has subnetwork address S.0 and host address S.38. As seen in routing table 400 of FIG. 4, therefore, the destination in this case is the subnetwork address, S.0, and the gateway to this destination is S.24, the address of port 24a of NCP 24.

Next, NCP 24 assembles a packet of data that includes: a header; the subnetwork and host addresses of NCP 24 (embedded in a source MAC address), the subnetwork and host addresses of NCP 38 (embedded in a destination MAC address), and the information intended for NCP 38 (hereinafter "NCP 24 data"). The packet is then supplied to SCM 22 and transmitted via fiber 66 at the service channel wavelength to SCM 26.

Upon receipt of the packet, SCM 26 compares the destination MAC address with the MAC address associated with NCP 28. Since the two MAC addresses do not match because the NCP 24 data is not intended for NCP 28, SCM 26 passes the packet to SCM 32 via fiber 68. Since the NCP 24 data is also not intended for NCP 34, SCM 32, in turn, passes the packet to SCM 36.

A processor in SCM 36 determines that the destination MAC address matches the MAC address associated with NCP 38. NCP 24 data is then forwarded from SCM 36 to NCP 38 via port 38a. NCP 38, in turn, extracts the subnetwork and host addresses from the received source and destination MAC addresses and appropriately processes the received NCP 24 data.

On the other hand, if data were to be sent from internet 78 (see FIG. 1) to NCP 28, for example, a subnetwork address attached to the data is used by router 85 to direct the data to input port 38b of NCP 38. Based on a host portion attached to the subnetwork address, NCP 38 determines that it is not the intended recipient of the data. Accordingly, NCP 38 refers to its routing table (see FIG. 7) and looks up the destination, subnetwork address S.0 and the corresponding gateway, S.38, the address of port 38b. The data is next supplied to SCM 36 with header and MAC addresses, as previously described. The resulting packet is then transferred from SCM to SCM until it reaches SCM 26, where it is passed to NCP 28. Routing tables 500 and 600 shown in FIGS. 5 and 6, respectively, are also used by routing software in NCPs 28 and 34 to route information in a manner similar to that previously described.

In the above examples, data is sent to a single NCP in a west-east direction, but a similar routing operation could be used to transmit along fibers 66, 68 and 70 in an east-west direction. Moreover, it is also considered within the scope of the invention that data, such as status and identification data, be distributed to all the NCPs in the span. In such instances, the MAC destination address could include broadcast bits, indicating that each NCP in the span is to receive the data, or multicast bits, in which only selected NCPs are to receive the data. Accordingly, an SCM, upon receipt of a broadcast MAC destination address, for example, will transmit the attached data to its respective NCP, and pass the header and data down the span to the next SCM.

In addition to NCP-related data (e.g., address and status information), each NCP can broadcast link state packets (LSPs) to other NCPs in the span. The LSP includes, for example, source and destination MAC addresses, a "hop count" (initialized to zero at the originating NCP of the LSP)

and a direction identifier. The LSP is successively detected and retransmitted by each SCM along the span. Prior to retransmission, however, the hop count is incremented and the LSP including the incremented hop count is transmitted to a corresponding NCP. Moreover, the SCM processor includes a MAC routing table listing MAC addresses and corresponding hop counts and direction identifiers, which is typically updated when source MAC addresses accompanied by corresponding hop counts and direction identifiers are received. Thus, both the NCPs and the SCMs know the location of the other NCPs on the span based on subnetwork and host addresses, as well as hop count and direction. Accordingly, if errors occur in the subnetwork or host addresses, information can be routed based on hop count and direction alone.

Further, the LSP can include a fault bit indicating, for example, whether a break has occurred in a particular segment of fiber. The SCMs monitor optical power levels on respective fibers and the sequence of received data, and, if either one or both of these parameters do not conform to predetermined criteria, the SCM adjusts the fault bit to signify that a fiber within the span has failed.

Preferably, each NCP, in conjunction with its associated SCM periodically broadcasts its LSP, as well as status and identification information. If an NCP does not receive such status information within a predetermined amount of time, that NCP address is "timed out" and deleted from the routing tables of the remaining NCPs in the span. While no breaks occur in any of the fibers in span 15, the subnetwork address is included in the periodic broadcast of identification and status information of each NCP. Further, address and hop count/direction information in the MAC routing tables in the SCMs can similarly be timed out and deleted.

If a break occurs in one of the fibers in span 15, the subnetwork address can no longer be used to route data because the data cannot freely propagate throughout the complete span. Accordingly, consistent with the present invention, host-specific addressing is used instead of subnetwork addressing.

For example, assuming that a break occurs in fiber 68, SCMs 26 and 32 detect the break and set the fault bit in an LSP to signify that a break has occurred. The LSP is next passed from SCM 32 to SCM 36, and from SCM 26 to SCM 22. If additional network elements were included in the span, the LSPs would be successively passed from SCM to SCM down the span until the terminals were reached. Each SCM, in turn, supplies a fault signal to their respective NCPs indicating that a fault has occurred.

In response to the fault signal, the NCPs, e.g., NCPs 24, 28, 34 and 38 along the span remove the subnetwork addresses and corresponding gateways from their routing tables. Moreover, NCPs 24 and 38 transmit information through internet 78 to notify monitoring equipment 75 and 76 that the subnetwork address is no longer available. Further, destination R85 and corresponding gateway S.38 is timed out and deleted from table 400 because, due to the break in fiber 68, status information cannot be transmitted from NCP 38 to NCP 24. Likewise, destination R24 and corresponding gateway S.24 are timed out and deleted from table 700.

Although a break has occurred, SCMs 22, 26, 32 and 36 continue to output LSPs and data concerning their respective NCPs. The source MAC address in each received LSP, which includes the host address, is then forwarded to respective NCPs. The NCP, in turn, updates its routing table to include the host address. In addition, corresponding gateways are obtained in accordance with Request for Comment No. 1389—Internet Engineering Task Force, incorporated herein by reference. As a result, revised routing tables 400, 500, 600 and 700 are obtained, as shown in FIGS. 8–11, respectively.

By way of example, transmission of data from NCP 28 to destination host address S.34 of NCP 34, will now be described. Since the subnetwork address cannot be used in this case, the transmitted data must be routed using a plurality of designated gateway addresses in order to reach its destination. Prior to transmitting the data, NCP 28 uses routing table 500 shown in FIG. 9 to determine the first gateway address to destination address S.34 of NCP 34. This first gateway address is S.24, the address of port 24a of terminal NCP 24. Accordingly, the data is transmitted from SCM 26 to SCM 22, which, in turn, passes the data to NCP 24 through port 24a. Routing table 400 in FIG. 8, lists address R24, i.e. port 24b of NCP 24, as the gateway to destination S.34. As a result, the data is transmitted via router 85 to NCP 38, which detects destination address S.34, identifies the gateway address S.38 in routing table 700 (see FIG. 11) and passes the data through S.38 to SCM 36. The data is then transmitted over the service channel to SCM 32, and transferred to NCP 34 through port 34a having destination address S.34. NCP 34, in turn, refers to routing table 600 (see FIG. 10), and recognizes that it is the intended recipient of the data.

As indicated previously, each NCP in span 15 periodically broadcasts status and identification information to the other NCPs in the span. The identification information, however, includes host specific addresses, but, as long as the SCMs 26 and 32 detect the fault in fiber 68, no subnetwork address.

In summary, therefore, data can be transmitted around the break in fiber 68 using host addresses to direct the data through the terminal NCPs. As a result, status and identification information continues to be distributed to all the NCPs even when a fault has occurred in a fiber of the span.

Once the break in fiber 68 is repaired or fiber 68 is replaced, SCMs 26 and 36 determine that fiber 68 is functional. The fault bit is set in an LSP to indicate normal operation. The LSP is next passed from SCM 32 to SCM 36, and from SCM 26 to SCM 22. These SCMs then notify NCPs 24, 28, 34 and 38 that the service channel is fully operational.

Upon receipt of periodically broadcast status and identification information from other NCPs in span 15, NCPs 24, 28, 34 and 38 add the subnetwork addresses to their respective routing tables. The host addresses are no longer periodically broadcast, and are thus successively timed out and deleted. Gateways are also obtained, in accordance with Request for Comment 1389 published by the Internet Engineering Task Force. The routing tables thus revert to including destinations and gateways as shown in FIGS. 4–7 and routing based on the subnetwork addresses resumes.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A wavelength division multiplexed (WDM) system, comprising:

a subnetwork including a plurality of network devices that are communicatively connected via an optical communication path carrying optical signals; and transmission means, within a first network device in the subnetwork, for transmitting information to a second network device in the subnetwork via the optical communication path, the transmitted information being addressed to the subnetwork and routed to the second network device by intervening network devices on the optical communication path based on the subnetwork address, wherein, in response to a fault in the optical communication path, said transmission means is operable to transmit the information to the second network device via an alternate communication path, such that the transmitted information is routed to the second network device using an address identifying the second network device, instead of the subnetwork address.

2. A WDM system in accordance with claim 1, wherein said transmission means is operable to periodically broadcast status information to the network devices in the subnetwork, the status information including an address identifying said network device.

3. A WDM system in accordance with claim 1, wherein the first network device includes,
storage means for storing a routing table, the routing table being configured to associate the subnetwork address with the second network element in absence of the fault in the optical communication path.

4. A WDM system in accordance with claim 3, wherein the first network device includes,
receiving means for receiving optical signals carried on the optical communication path; and
detection means for detecting the fault in the optical communication path based on the received optical signals.

5. A WDM system in accordance with claim 4, further comprising:
broadcast means, within each network element in the subnetwork, for periodically broadcasting status information, the status information including addresses identifying the network element,
wherein the receiving means of the first network element is configured to receive the status information periodically broadcast by other network elements in the subnetwork.

6. A WDM system in accordance with claim 5, wherein said detection means is operable to detect the fault in the optical communication path when the receiving means does not receive the status information from one or more of the other network devices in the subnetwork.

7. A WDM system in accordance with claim 6, wherein the receiving means of the first network device receives status information broadcast by the second network device, the received status information including a host specific address identifying the second network device, and
said WDM system further comprises:
address setting means, in the first network element, for reconfiguring the routing table in response to the detected fault in the optical communication path, the routing table being reconfigured to replace the subnetwork address with the host specific address as being associated with the second network device.

8. A WDM system in accordance with claim 7, wherein the transmitting means, in response to the detected fault in the optical communication path, is configured to use the host specific address to transmit the data to the second network element via the alternate communication path.

9. The first network element as recited in claim 8.

10. A WDM system in accordance with claim 4, wherein the detection means includes,
monitoring means for monitoring one or more parameters associated with the received optical signals,
wherein the detection means detects the fault in the optical communication path based on the monitored parameters.

11. A WDM system in accordance with claim 10, wherein the monitored parameters include at least one of a power level and a sequence of data associated with the received optical signals.

12. A WDM system in accordance with claim 1, wherein the alternate communication path includes an Internet Protocol (IP) router communicatively connected to the second network device.

13. A WDM system in accordance with claim 12, wherein the IP router is coupled to an IP network,
the transmitting means, in response to the fault in the optical communication path, is configured to notify monitoring equipment connected to the IP network that the subnetwork address is no longer available for data transmission to the plurality of network devices in the subnetwork.

14. A WDM system in accordance with claim 1, wherein the alternate communication path includes at least one non-optical link.

15. A method for communication in a network device, the network device being incorporated in a subnetwork of a wavelength division multiplexed (WDM) system, the subnetwork comprising a plurality of network devices that are communicatively connected via an optical communication path carrying optical signals, said method comprising:
transmitting information to a second network device in the subnetwork via the optical communication path, the transmitted information being addressed to the subnetwork and routed to the second network device by intervening network devices on the optical communication path based on the subnetwork address,
wherein, in response to a fault in the optical communication path, said transmitting step transmits the information to the second network device via an alternate communication path, such that the transmitted information is routed to the second network device using an address identifying the second network device, instead of the subnetwork address.

16. A method in accordance with claim 15, further comprising:
storing a first routing table, which associates the subnetwork address with the second network element in absence of the fault in the optical communication path.

17. A method in accordance with claim 16, further comprising:
receiving optical signals carried on the optical communication path; and
detecting the fault in the optical communication path based on the received optical signals.

18. A method in accordance with claim 17, wherein said detecting step detects the fault in the optical communication path when status information is not received from one or more of the other network devices in the subnetwork within a predetermined time period.

19. A method in accordance with claim 18, further comprising:
reconfiguring the routing table in response to the detected fault in the optical communication path, the routing table being reconfigured to associate an address identifying the second network device with the second network device.

20. A method in accordance with claim 19, wherein the transmitting step, in response to the detected fault in the optical communication path, transmits the data to the second network element via the alternate communication path using the address identifying the second network device.

21. A method in accordance with claim 15, wherein the transmitting step, when transmitting information via the alternate communication path, utilizes a path including at least one non-optical link.

* * * * *